June 24, 1947.  J. STRUK ET AL  2,422,756
ELECTRIC RESISTANCE WELDING
Filed March 14, 1944  2 Sheets-Sheet 1

INVENTORS
ROBERT W. GOOD
JOHN STRUK
BY George T. Gill
ATTORNEY

INVENTORS
ROBERT W. GOOD
JOHN STRUK
BY George F. Gill
ATTORNEY

Patented June 24, 1947

2,422,756

UNITED STATES PATENT OFFICE 2,422,756

ELECTRIC RESISTANCE WELDING

John Struk and Robert W. Good, Brooklyn, N. Y., assignors to Murray Manufacturing Corporation, Brooklyn, N. Y., a corporation of New York Application March 14, 1944, Serial No. 526,419

3 Claims. (Cl. 219—4)

The invention herein disclosed relates to electric resistance welding wherein two pieces of metal to be welded are electrically heated and moved together beyond their contact to cause the metal of one piece to flow into the metal of the other.

In electric resistance welding metal is extruded at the weld and forms a burr which, in accordance with present practice, is subsequently removed by a shearing or machining operation. The burrs formed are irregular and while external burrs are readily removed by shearing and machining operations, internal irregular burrs and heavy metal blobs present great difficulty in that they interfere with placing the article on arbors and break machine tools.

An object of this invention is to remove or reduce the burr and metal blobs as the weld is effected. In accordance with the invention, a stream of an oxidizing medium, under pressure, is directed along the weld as the weld is effected. Air under pressure may be used for this purpose and a jet or stream of air is directed along the weld just as the weld is effected and the burr formed. The burr at this time is at the welding temperature and it is reduced and the metal blobs formed are removed.

A clearer understanding of the invention may be had from the following description thereof as it is applied in the production of hollow metal articles in the apparatus disclosed in the accompanying drawings.

Figure 1:
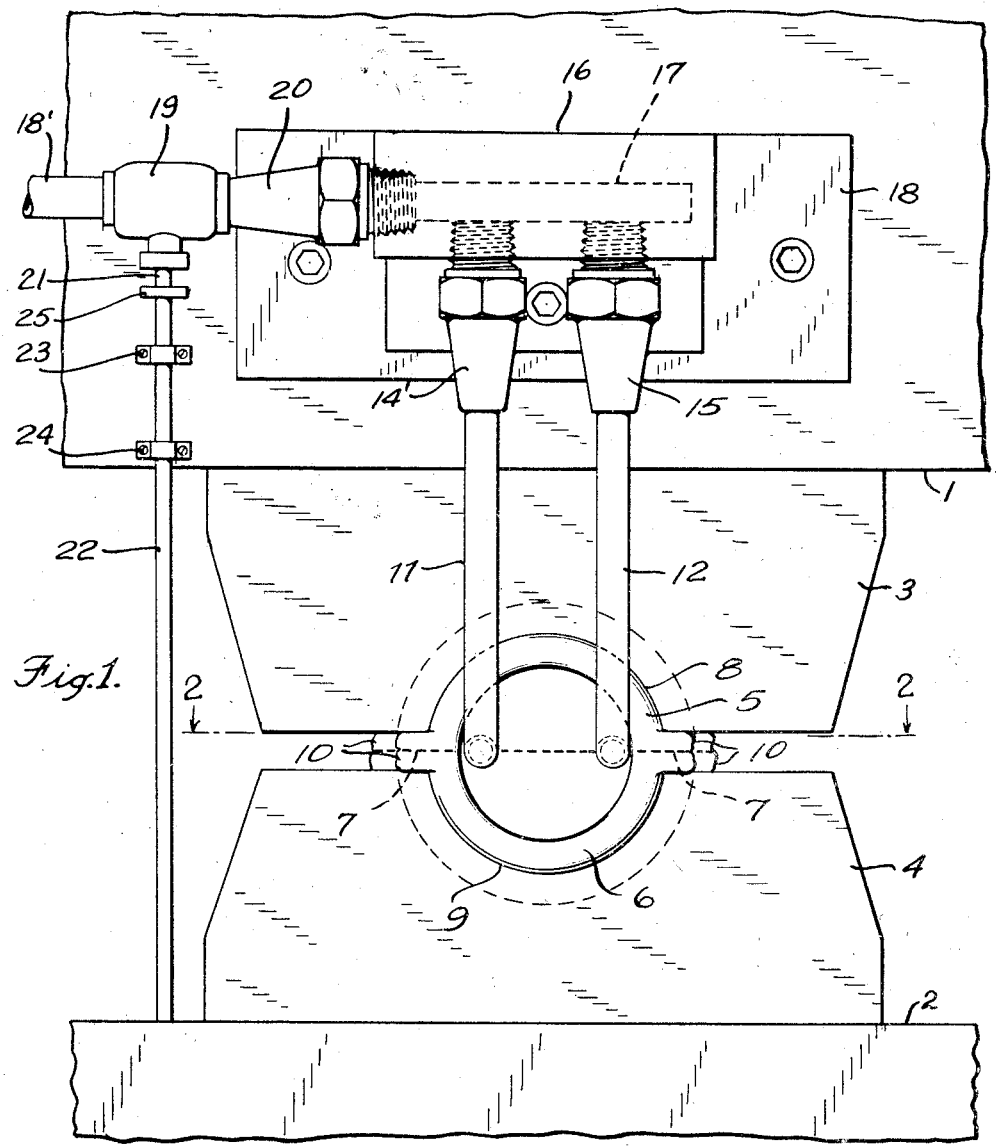
Figure 2:
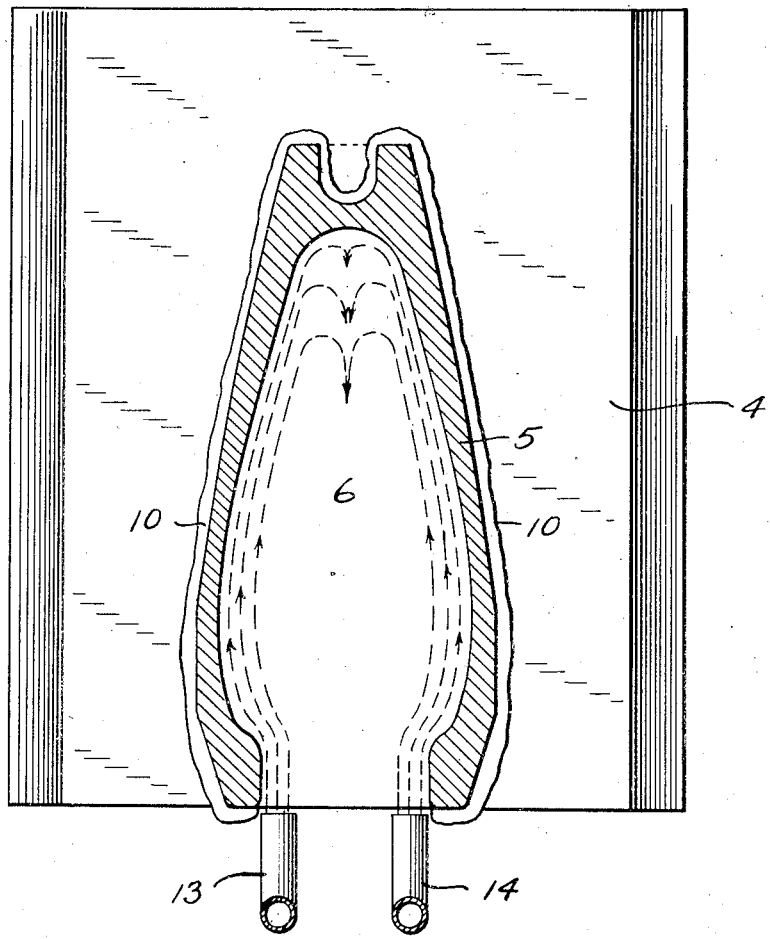

The drawings include:

Fig. 1 which is a front elevation of a portion of an electric resistance welder; and Fig. 2 which is a plan taken on the line 2—2 of Fig. 1.

In Fig. 1 of the drawings, there is illustrated the electrode supports 1 and 2 which are commonly used in electric resistance welders and electrodes 3 and 4 that are carried by the electrode supports 1 and 2. The electrode support 2 is stationary and the electrode support 1 is movable, toward and away from the electrode support 2, in a vertical direction. The electrodes illustrated are for making mortar shells which consist of two like sections 5 and 6 welded together as at 7. Preferably, and commonly, the electrodes are made of copper and the electrode 3 has a recess 8 in which a shell section is received. A like recess 9 is formed in the electrode 4.

In effecting a weld, a shell section is placed in the recess 6 and another shell section is placed thereon in edge to edge contact therewith. The electrode support 1 and the electrode 3 are, of course, raised at this time. When the shell sections are so placed in the welder, the electrode support 1 is moved down until the electrode 3 engages the upper shell section and pressure is exerted to press the shell sections into pressure contact along the contacting edges. A heavy electric current is then caused to flow from one electrode to the other through those portions of the shell sections, the weld area, which are not in contact with the electrodes. In this way, the metal in the weld area, the contacting edges and the portions between the edges and the electrodes, is heated to a temperature at which the metal becomes plastic. At this point under the pressure exerted, or in some cases under additional pressure, the metal of one piece flows into the metal of the other as the electrode 3 moves towards the electrode 4. The excess metal is extruded from both surfaces forming internal and external burrs, such as the external burrs 10. As the pieces move to effect the weld, the welding current is cut off, and upon movement through a definite, predetermined amount, further movement is prevented and the weld is effected or completed.

Just as the weld is effected, the metal constituting the burr and extruded blobs of metal are at the welding temperature. If at this time, a jet or stream of air under pressure is directed along the weld, the burr is reduced, in some cases removed, and any blobs of metal are loosened and removed. The jet of air appears to act in two ways. The pressure removes loose particles and blobs of metal and the oxygen effects oxidation, in the hot metal, in the manner of a cutting torch. Such action, in the apparatus illustrated is effected for reducing and partially removing the internal burrs.

In the apparatus illustrated, two air jets 11 and 12 are carried by and depend from the movable electrode support 1. These may desirably consist of three-eighths inch copper tubing having end sections 13 and 14 directed along the line of or in the plane of the weld when the electrode 1 is in the position at which a weld is completed. The tubes are connected, through couplings 14' and 15 to a block 16 in communication with an air passage 17 in the block. A plate or base 18 upon which the block 17 is mounted is secured to the front face of the electrode support 1. The air passage 17 is supplied with air under pressure through a flexible air supply passage 18' connected to the block 17 through a valve 19 and a coupling 20.

The valve 19 is of the kind, well known in the art, which is spring pressed to closed position and opened by pressure on a valve stem 21. In the apparatus illustrated, the valve is opened through a valve actuating rod 22. This rod is slidably mounted in bearing brackets 23 and 24 mounted on the electrode support 1. At the upper end of the rod there is a head 25 formed on the rod and positioned to engage the end of the valve stem 21. The rod extends down and is of such length that upon the final movement of the electrode support 1 in affecting a weld, it engages the electrode support 2 and presses the valve stem 21 to open the valve 19. Thus, as the weld is effected, air under pressure is supplied to the tubes 11 and 12 and jets of air are directed along the weld at the inner surface of the shell.

In Fig. 2 of the drawings the path of the air streams are illustrated. Each stream of air moves along the surface of the shell at the weld. At the end of the shell, the two streams meet and form a single stream returning at the center of the shell. The burr metal removed by the air jets is thus carried out of the shell.

It will be obvious that various changes may be made by those skilled in the art in the steps of the method and the details of the apparatus comprehended within this invention and described in detail above within the principle and scope of the invention as defined in the appended claims.

We claim:

1. In an electric resistance welder in which two pieces of metal are welded with the formation of a burr, the combination comprising relatively movable, spaced electrode supports, electrodes carried by the supports arranged to accommodate two pieces of metal therebetween in contact with each other and upon the heating of the metal pieces in the area between the electrodes effect movement of the pieces toward each other whereby a weld is effected by the metal of one piece flowing into the other and a burr is extruded, a fluid jet positioned to direct a fluid along the weld, a source of oxidizing fluid under pressure connected to said jet, valve means interposed in the connection between the jet and the oxidizing fluid under pressure, and means operative as the weld is effected to actuate said valve means to permit the oxidizing fluid to be discharged from said jet along the weld, whereby the burr is reduced and blobs of metal removed.

2. In an electric resistance welder in which two pieces of metal are welded with the formation of a burr, the combination comprising relatively movable, spaced electrode supports, electrodes carried by the supports arranged to accommodate two pieces of metal therebetween in contact with each other and upon the heating of the metal pieces in the area between the electrodes effect movement of the pieces toward each other whereby a weld is effected by the metal of one piece flowing into the other and a burr is extruded, a fluid jet carried by one of the electrode supports and positioned to direct a fluid along the weld, a source of oxidizing fluid under pressure connected to said jet, valve means interposed in the connection between the jet and the oxidizing fluid under pressure, and means operative as the weld is effected to actuate said valve means to permit the oxidizing fluid to be discharged from said jet along the weld, whereby the burr is reduced and blobs of metal removed.

3. In an electric resistance welder in which two pieces of metal are welded with the formation of a burr, the combination comprising a stationary electrode support, a movable electrode support, electrodes carried by said supports arranged to accommodate two pieces therebetween in contact with each other and upon the heating of the metal pieces in the area between the electrodes effect movement of the pieces toward each other whereby a weld is effected by the metal of one piece flowing into the other and a burr is extruded, a fluid jet carried by the movable electrode support and positioned to direct a fluid along the weld, a source of oxidixing fluid under pressure connected to said jet, valve means interposed in the connection between the jet and the oxidizing fluid under pressure, and means operative as the weld is effected to actuate said valve means to permit the oxidizing fluid to be discharged from said jet along the weld, whereby the burr is reduced and blobs of metal removed.

JOHN STRUK.
ROBERT W. GOOD.

REFERENCES CITED

The following references are of record in the file of this patent:

UNITED STATES PATENTS

| Number | Name | Date |
| --- | --- | --- |
| 1,722,195 | Bumstead et al. (1) | July 23, 1929 |
| 1,924,220 | Turnquist (1) | Aug. 29, 1933 |
| 2,034,560 | Bumstead et al. (2) | Mar. 17, 1936 |
| 1,976,250 | Turnquist (2) | Oct. 9, 1934 |
| 1,363,356 | Sander | Dec. 28, 1920 |
| 1,435,996 | Taylor | Nov. 21, 1922 |
| 2,162,868 | Smith | June 20, 1939 |
| 1,788,201 | Murray et al. | Jan. 6, 1931 |